(No Model.)
S. H. CHADWICK.
HARROW.
No. 365,046. Patented June 21, 1887.
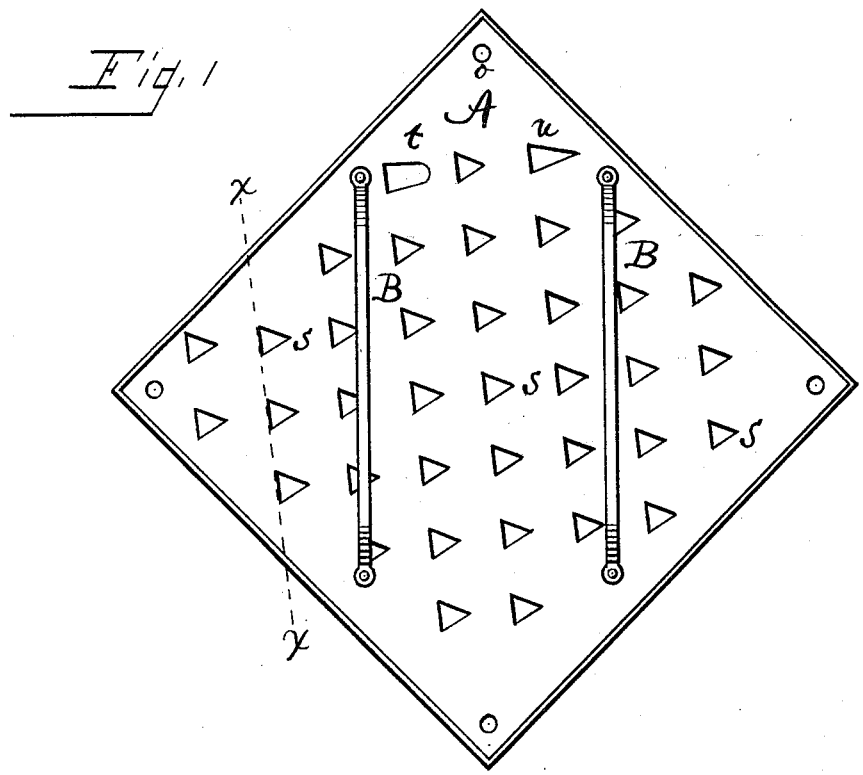
Fig. I
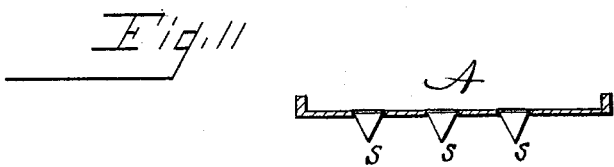
Fig. II
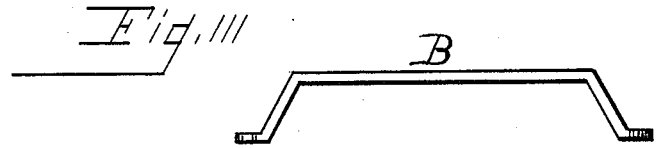
Fig. III
Witnesses
Will C. Kette
James Turpin
Inventor
Samuel H. Chadwick
By His Attorney B. Pickering

UNITED STATES PATENT OFFICE.

SAMUEL H. CHADWICK, OF DAYTON, OHIO.

HARROW.

SPECIFICATION forming part of Letters Patent No. 365,046, dated June 21, 1887.

Application filed April 8, 1887. Serial No. 234,110. (No model.)

*To all whom it may concern:*

Be it known that I, SAMUEL H. CHADWICK, a citizen of the United States, residing at Dayton, in the county of Montgomery and State of Ohio, have invented a certain new and useful Improvement in Harrows; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in harrows; and it consists in forming the same of a single plate of iron or steel, out of which the teeth are punched and bent at a right angle to the plate, thus forming the frame and teeth from the same plate.

The mechanism is illustrated in the accompanying drawings, in which—

Figure I is a top view of the harrow. Fig. II is a section on the line $x$, Fig. I. Fig. III is a side view of the runner.

Like letters designate like parts throughout the several views.

A is a quadrangular plate of iron or steel, the edges being turned up, as shown at Fig. II, to stiffen the same. Angular points $s$ are punched in the plate, and these are bent at about a right angle to the plate to form a series of teeth. Three of these are shown in the sectional view, Fig. II. The form of the teeth may vary, as shown at $t$ and $u$, Fig. I.

B B are runners of round or square iron, of the form shown at Fig. III, and are riveted or bolted to the top of the frame. When the harrow is turned top side down these serve to support the same when dragged over the ground. I punch holes in the corners for the purpose of attaching the team, and these may be made at any other points along the border; but I prefer to make the attachment at the hole $o$ and arrange the teeth at an angle to the line of the direction of the draft, as shown at Fig. I.

My invention consists, broadly, in forming a harrow from a metallic plate, from which is punched and formed the teeth.

The form of the frame and the form and size of the teeth may be varied, as may be desirable.

The rim of the frame may be bent at a right angle or at any angle of inclination from the body.

Having fully described my invention, what I claim, and desire to secure by Letters Patent, is—

A harrow formed of a single piece of steel or iron plate with a series of lips cut in said plate and bent at a right angle to form teeth, said teeth being arranged in series at an angle to the line of draft, substantially as set forth.

In testimony that I claim the foregoing as my own I affix my signature in presence of two witnesses.

SAMUEL H. CHADWICK.

Witnesses:
B. PICKERING,
OSCAR F. DAVISSON.